United States Patent
Miyanaga

(10) Patent No.: US 9,457,491 B2
(45) Date of Patent: Oct. 4, 2016

(54) COOLANT SUPPLY DEVICE AND ELECTRIC DRILL UNIT PROVIDED WITH COOLANT SUPPLY DEVICE

(75) Inventor: Masaaki Miyanaga, Miki (JP)

(73) Assignee: KABUSHIKI KAISHA MIYANAGA, Miki-shi, Hyogo (JP)

( * ) Notice: Subject to any disclaimer, the term of this patent is extended or adjusted under 35 U.S.C. 154(b) by 284 days.

(21) Appl. No.: 14/122,650

(22) PCT Filed: May 21, 2012

(86) PCT No.: PCT/JP2012/003297
§ 371 (c)(1),
(2), (4) Date: Feb. 20, 2014

(87) PCT Pub. No.: WO2012/164860
PCT Pub. Date: Dec. 6, 2012

(65) Prior Publication Data
US 2014/0154020 A1 Jun. 5, 2014

(30) Foreign Application Priority Data

May 30, 2011 (JP) .................................. 2011-120481

(51) Int. Cl.
*B23B 51/06* (2006.01)
*B28D 7/02* (2006.01)
(Continued)

(52) U.S. Cl.
CPC ............... *B28D 7/02* (2013.01); *B23B 45/003* (2013.01); *B23B 51/06* (2013.01); *B28D 1/041* (2013.01);
(Continued)

(58) Field of Classification Search
CPC ... B23Q 11/10; B23Q 11/1015; B23B 51/06; B23B 51/042; B23B 51/0486; B23B 2231/24; B23B 2270/24; B23B 2250/12; B23B 45/003; Y10T 408/44; Y10T 408/45; Y10T 408/453; Y10T 408/455; Y10T 408/458; Y10T 408/46

USPC ....................................... 408/56–61; 279/20
See application file for complete search history.

(56) References Cited

U.S. PATENT DOCUMENTS

| | | | | |
|---|---|---|---|---|
| 288,957 A | * | 11/1883 | Soderstrom | ......... B23B 51/0486 |
| | | | | 279/103 |
| 5,890,849 A | * | 4/1999 | Cselle | .................... B23B 31/00 |
| | | | | 279/20 |

(Continued)

FOREIGN PATENT DOCUMENTS

| | | | |
|---|---|---|---|
| DE | 19614850 A1 | * 10/1996 | ......... B23Q 11/1084 |
| EP | 1 559 516 A2 | 8/2005 | |

(Continued)

OTHER PUBLICATIONS

Extended European Search Report for EP 12 79 2366, dated Nov. 20, 2014.

(Continued)

*Primary Examiner* — Sunil K Singh
*Assistant Examiner* — Nicole N Ramos
(74) *Attorney, Agent, or Firm* — Marshall, Gerstein & Borun LLP

(57) ABSTRACT

A coolant supply device attached to an electric drilling tool is configured to supply a coolant to a drilling portion at a distal end of a drill. The coolant supply device includes: a first flange member and a second flange member provided axially on a rotating shaft, the rotating shaft sharing a same axis with the drill, the first flange member being positioned at the drill side, the second flange member being positioned such that the second flange member is more distant from the drill than the first flange member; space formed between the flange members, into which a coolant is injected; a coolant supply passage formed between the first flange member and the drill and guiding the coolant in the space to the drill; and a coolant push-out mechanism configured to push the coolant out of the space toward the coolant supply passage.

6 Claims, 10 Drawing Sheets

(51) Int. Cl.
    *B28D 1/04*      (2006.01)
    *B28D 1/14*      (2006.01)
    *B23B 45/00*     (2006.01)
(52) U.S. Cl.
    CPC .............. *B28D 1/14* (2013.01); *B23B 2226/75* (2013.01); *B23B 2231/24* (2013.01); *Y10T 408/44* (2015.01); *Y10T 408/455* (2015.01)

(56) References Cited

U.S. PATENT DOCUMENTS

| | | | |
|---|---|---|---|
| 6,116,825 A * | 9/2000 | Kammermeier | B23B 51/06 279/20 |
| 6,543,319 B1 * | 4/2003 | Kress | B23B 29/034 82/50 |
| 2009/0129878 A1 | 5/2009 | Miyanaga | |

FOREIGN PATENT DOCUMENTS

| | | | |
|---|---|---|---|
| JP | 50-68989 B2 | | 6/1975 |
| JP | H01-316109 A | | 12/1989 |
| JP | 3-47710 | | 5/1991 |
| JP | 03-190684 B2 | | 8/1991 |
| JP | 11-507880 | | 7/1999 |
| JP | 2000-513275 A | | 10/2000 |
| JP | 2003025183 A | * | 1/2003 |
| KR | 20-0228108 | | 6/2001 |
| WO | WO-2006/075556 A1 | | 7/2006 |

OTHER PUBLICATIONS

International Search Report for PCT/JP2012/003297, mailed Jul. 31, 2012.

* cited by examiner

COOLANT SUPPLY DEVICE AND ELECTRIC DRILL UNIT PROVIDED WITH COOLANT SUPPLY DEVICE

TECHNICAL FIELD

The present invention relates to a coolant supply device configured to supply a coolant to a drilling portion of a drill when the drill drills a hole into a workpiece such as concrete or stone. The present invention also relates to an electric drill unit provided with coolant supply device.

BACKGROUND ART

In the case of drilling a hole into concrete, stone, or the like, an electric drilling tool provided with a drill such as a diamond core drill is used, for example.

When performing drilling by using the above electric drilling tool, a coolant is supplied to a cutting edge portion (drilling portion) of the drill for the purpose of cooling down the cutting edge of the drill and facilitating the discharging of chips.

Conventionally, it has been proposed to connect between a coolant supply pump including a coolant tank and a drill by a supply hose, and to supply a coolant from the coolant tank to a drilling portion of the drill (Patent Literature 1).

In recent years, so-called "battery-powered (rechargeable) electric drilling tools" and the like, which eliminate the necessity of power cord connection and thereby realize a high degree of freedom in handling, are widely used in construction sites and the like. Such a battery-powered electric drilling tool is superior in terms of allowing a user to perform necessary drilling work at a desired place without requiring power cord connection (Patent Literature 2).

CITATION LIST

Patent Literature

PTL 1: (PCT) International Publication No. WO2006/075556
PTL 2: Japanese Laid-Open Patent Application Publication No. Hei 3-190684

SUMMARY OF INVENTION

Technical Problem

Battery-powered electric drilling tools need not include a power cord. However, in order to supply a coolant to such an electric drilling tool, it is necessary to always carry around a heavy coolant tank including a coolant supply pump to a drilling work site.

As a result, freedom in the use of the electric drilling tool is restricted, which is inconvenient. In addition, since the electric drilling tool is equipped with a coolant tank including a coolant supply pump, there are cases where performing drilling work in small space is difficult.

The present invention has been made in view of the above. An object of the present invention is to provide a coolant supply device capable of storing a coolant in an amount that is minimum required for drilling and capable of supplying the coolant to a drilling portion at the distal end of a drill when the drill performs drilling.

Solution to Problem

A coolant supply device according to the present invention is attached to an electric drilling tool and configured to supply a coolant to a drilling portion at a distal end of a drill when the drill performs drilling. The coolant supply device includes: a first flange member and a second flange member provided on a rotating shaft, the rotating shaft sharing a same axis with the drill, the first flange member being positioned at the drill side, the second flange member being positioned such that the second flange member is more distant from the drill than the first flange member along the rotating shaft; space formed between the flange members, into which a coolant is injected; a coolant supply passage formed between the first flange member and the drill, the coolant supply passage guiding the coolant in the space to the drill; and a coolant push-out mechanism configured to push the coolant out of the space toward the coolant supply passage.

Advantageous Effects of Invention

According to the coolant supply device of the present invention, first, the coolant in an amount that is necessary for drilling is stored in the space between the flange members. Then, at the time of drilling, the coolant can be supplied to the drilling portion at the distal end of the drill by means of the coolant push-out mechanism. This eliminates a need for an operator to carry around a coolant tank including a coolant supply pump, and thereby realizes a high degree of freedom in handling the electric drilling tool. Since it is no longer necessary to carry around a coolant tank, drilling work in small space can be readily performed. Therefore, by applying the coolant supply device according to the present invention to a battery-powered electric drilling tool, the advantages of the battery-powered electric drilling tool can be made use of to a greater degree.

DESCRIPTION OF EMBODIMENTS

Embodiment 1

Figure 1:
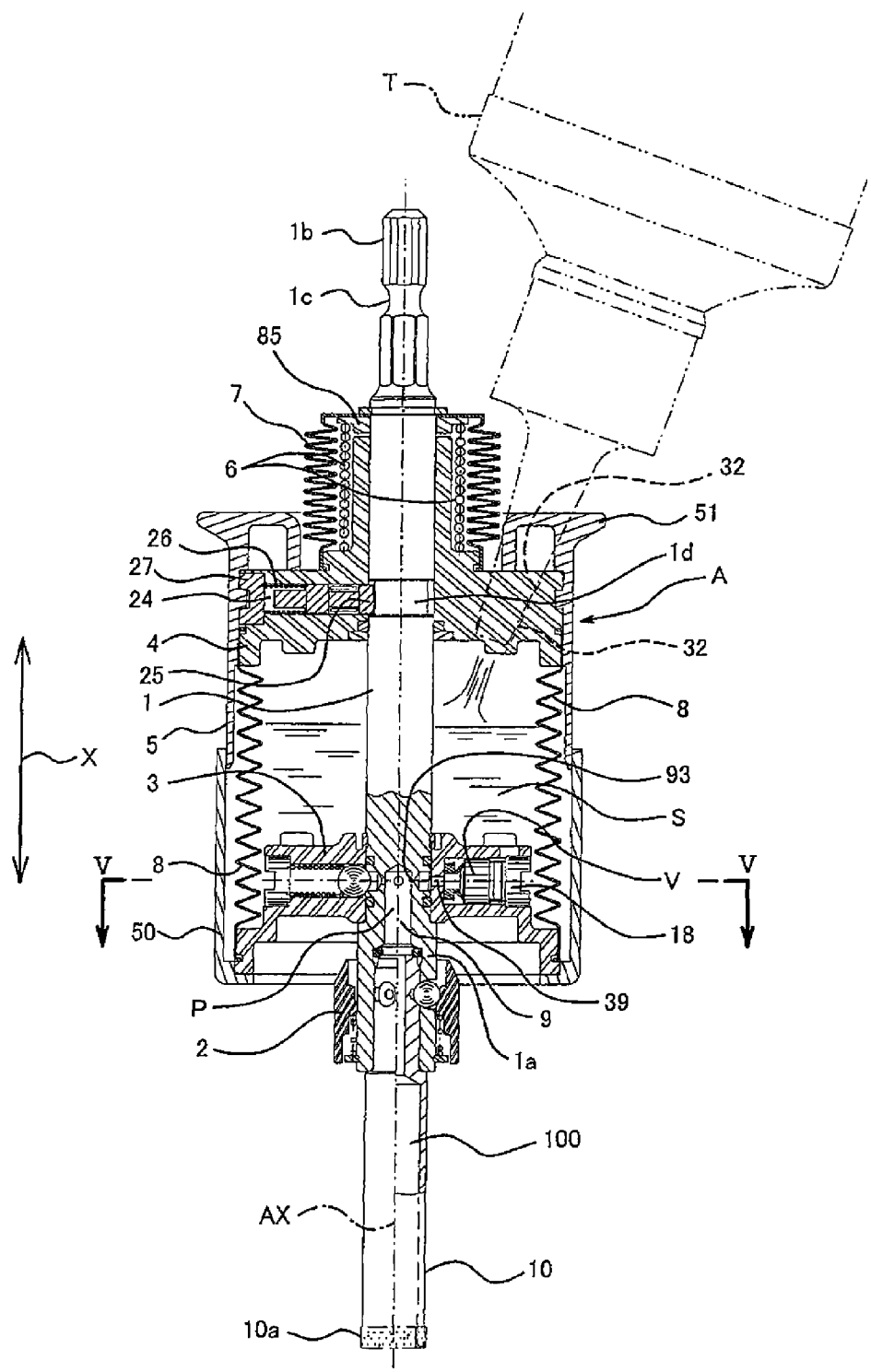
FIG. 1 is a cutaway sectional side view of a coolant supply device according to one embodiment of the present invention, the view being taken along the axial direction of the coolant supply device.

Hereinafter, a coolant supply device according to one embodiment of the present invention is described with reference to the drawings. In the drawings, the same or corresponding elements are denoted by the same reference signs, and a repetition of the same description is avoided. In the description below, a term "coolant" covers a wide concept including a cutting fluid; a term "drill" covers a wide concept including a core drill; and a term "electric drilling tool" covers a wide concept including not only electric drilling tools supplied with power via a power cord or a battery, but also pneumatic and hydraulic drilling tools.

Although the coolant is usually water, it is conceivable to use a different low-viscosity liquid as the coolant. Further, low-viscosity oil may be used as the coolant in a case where the workpiece to be drilled is not concrete or stone but, for example, a steel plate.

Figure 2:
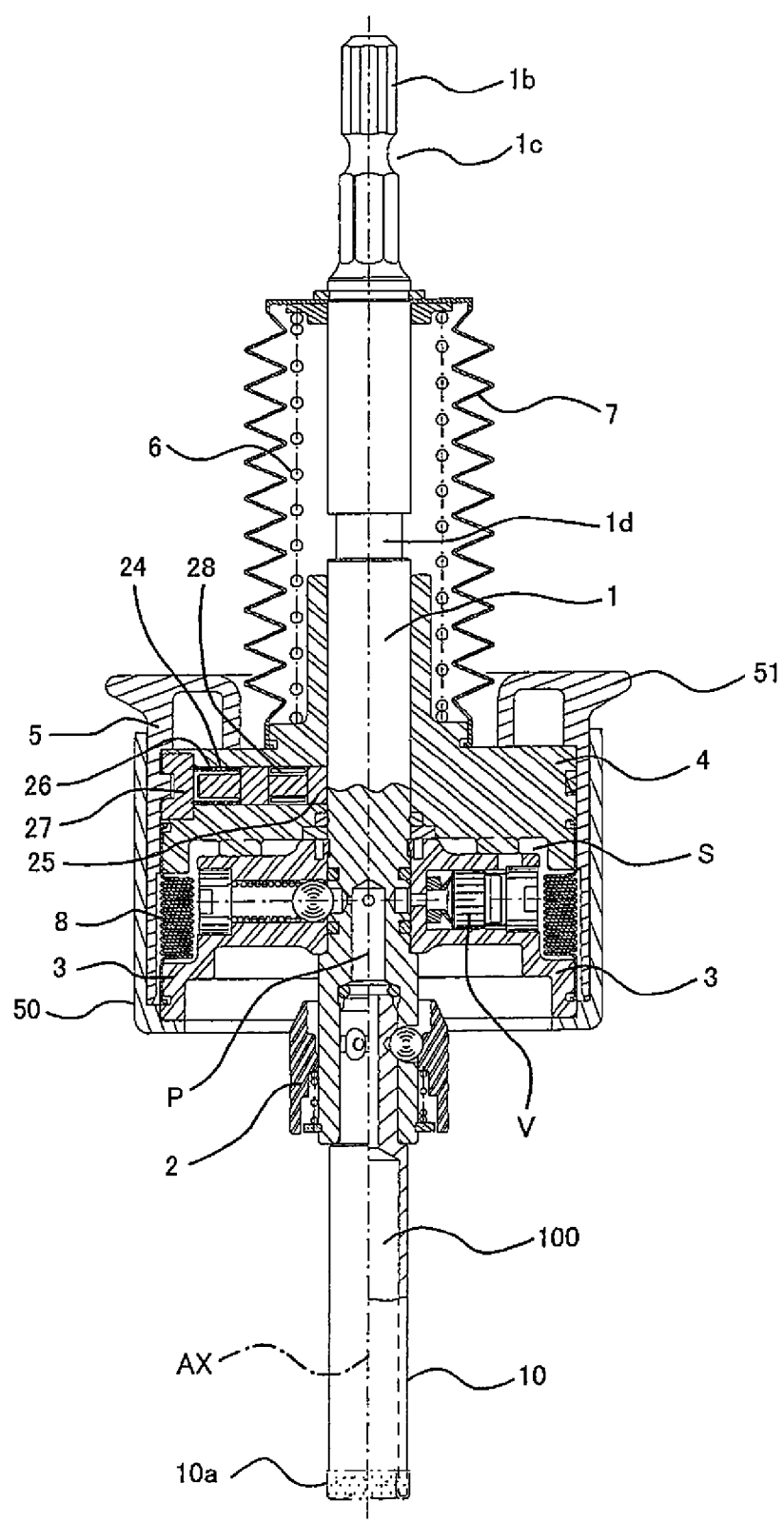
FIG. 2 is a sectional side view of the coolant supply device when a cylindrical body is in a compressed state.
Figure 3:
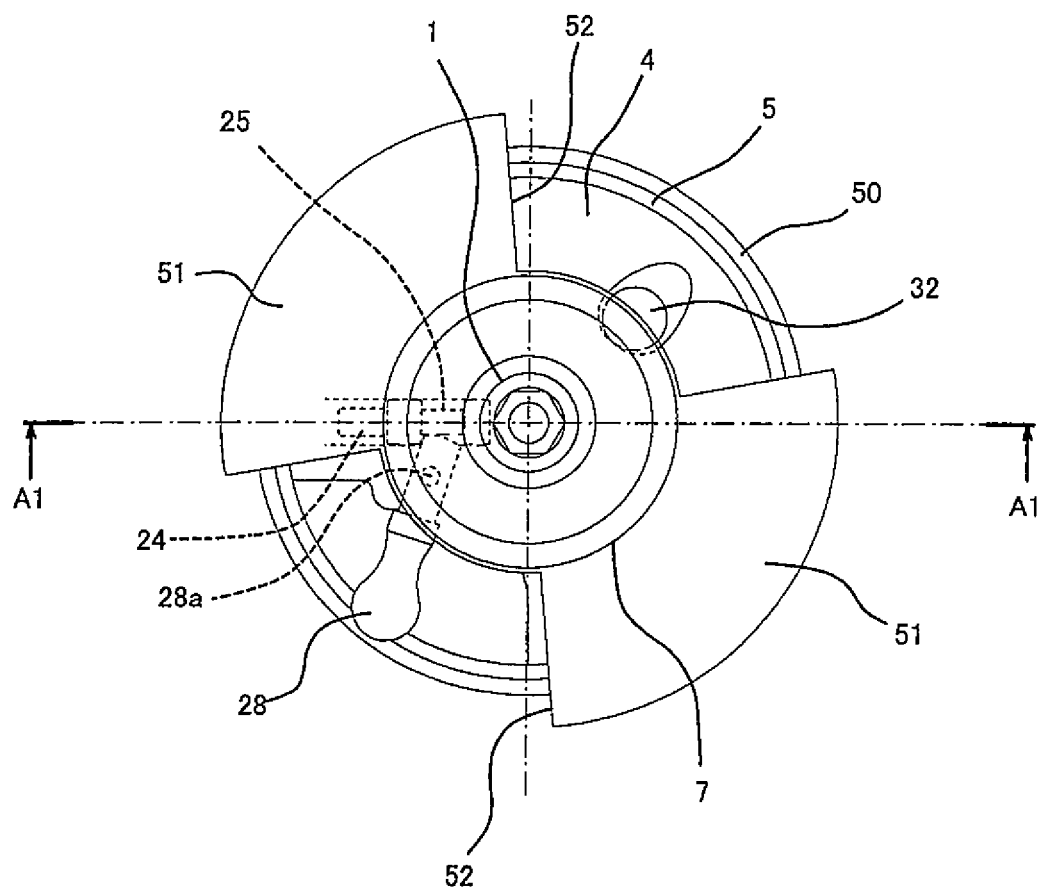
FIG. 3 is a plan view of the coolant supply device shown in FIG. 1.

FIG. 1 and FIG. 2 are sectional views of the coolant supply device according to the present embodiment. FIG. 3 is a plan view of FIG. 1. FIG. 1 is a cutaway sectional view of FIG. 3, the view being taken along a plane including line A1-A1 of FIG. 3, the view being seen in the direction of the arrows of line A1-A1. In FIG. 1, the reference sign A indicates the coolant supply device, which is configured to supply a coolant to a drilling portion at the distal end of a drill when the drill performs drilling. The coolant supply device A is attached to an electric drilling tool, and thereby an electric drill unit is formed. As shown in FIG. 1 and FIG. 2, the coolant supply device A includes an upper cover 5 whose lower surface is open and a lower cover 50 whose upper surface is open. The diameter of the upper cover 5 is slightly less than the diameter of the lower cover 50. The upper cover 5 is fitted in the lower cover 50 in a manner that allows these covers to move toward and away from each other. Both of the covers 5 and 50 are formed of a transparent or semi-transparent resin. A rotating shaft 1 vertically penetrates through the center of the covers 5 and 50. A drill 10 is detachably attached to a distal end (lower end) 1a of the rotating shaft 1 via a chuck 2. In the present embodiment, the drill 10 is a diamond core drill. A drilling portion (cutting edge portion) 10a is formed at the lower end of the drill 10. The rotating shaft 1 and the drill 10 are provided on the same axis, and integrally rotate around the shared rotational central axis AX. The drill 10 has a hollow center. Inside the drill 10, a passage 100 through which the coolant flows toward the drilling portion 10a is formed.

An upper end 1b of the rotating shaft 1 is formed substantially in the shape of a hexagonal cylinder having a notch 1c formed at its middle portion so that the upper end 1b can be inserted into and pulled out of an insertion hole of a rotating shaft holder of a battery-powered electric drilling tool (not shown). The rotating shaft 1 is driven to rotate in a state where the rotating shaft 1 is attached to the rotating shaft holder of the electric drilling tool.

As shown in FIG. 1 and FIG. 2, a first flange member 3 positioned within the lower cover 50 and a second flange member 4 attached to the upper cover 5 are provided on the rotating shaft 1 in a manner to share substantially the same axis. Up-down movement of the first flange member 3 along the rotating shaft 1 is restricted, whereas rotation of the first flange member 3 around the rotating shaft 1 is allowed. Although the first flange member 3 usually rotates integrally with the rotating shaft 1, the first flange member 3 can be caused to rotate independently of the rotating shaft 1 through a manual operation by an operator. Such a configuration will be described below in detail. The second flange member 4 is configured such that the second flange member 4 can be lifted and lowered along the rotating shaft 1 together with the upper cover 5.

The upper end of the upper cover 5 forms a grip portion 51 which extends laterally. The grip portion 51 includes two arc notches 52 which are formed in a circumferential direction (see FIG. 3). A coolant supply port 32, which is inclined relative to the rotating shaft 1, is formed in the upper surface of the second flange member 4. The coolant supply port 32 is exposed at one of the notches 52. The distal end of a supply container T (see FIG. 1) storing the coolant is inserted into the coolant supply port 32 through the one notch 52.

As shown in FIG. 1, inside the covers 5 and 50, a bellows-shaped cylindrical body 8 is disposed between the first flange member 3 and the second flange member 4 so as to cover the rotating shaft 1 from the outside. The cylindrical body 8 is formed of a semi-transparent flexible resin. The coolant from the supply container T is supplied to the inside of the cylindrical body 8.

The cylindrical body 8 covers the rotating shaft 1 from the outside. The distal end of the cylindrical body 8 is connected to the first flange member 3 in a fluid-tight manner. The proximal end of the cylindrical body 8 is connected to the second flange member 4 in a fluid-tight manner. As a result, fluid-tight space S, which is surrounded by the cylindrical body 8, the first flange member 3, and the second flange member 4, is formed within the cylindrical body 8.

A substantially discoid flange member 85 is fixed to the rotating shaft 1 above the second flange member 4. A push spring 6, which biases the second flange member 4 downward, is disposed between the flange member 85 and the second flange member 4.

Outside the push spring 6, a dust-proof bellows member 7 is disposed, in a stretchable manner, to cover an outer peripheral portion between the flange member 85 and the second flange member 4. That is, the dust-proof bellows member 7 prevents dirt or the like, such as chips, from entering the inside thereof, thereby protecting the rotating shaft 1. The bellows member 7 is formed of a semi-transparent flexible resin.

FIG. 1 shows a state where the cylindrical body 8 extends in the up-down direction. In this state, the coolant is supplied into the cylindrical body 8. This state is hereinafter referred to as an expanded state. Meanwhile, FIG. 2 shows a state where the second flange member 4 is biased downward by the push spring 6, and thereby the cylindrical body 8 is compressed from the expanded state. This state is hereinafter referred to as a compressed state.

In FIG. 1 and FIG. 2, the second flange member 4 is biased by the push spring 6. However, as an alternative example, the bellows member 7 may have a spring function instead of the push spring 6. Further alternatively, the cylindrical body 8 may have a spring function.

(Coolant Supply Passage)

Figure 4:
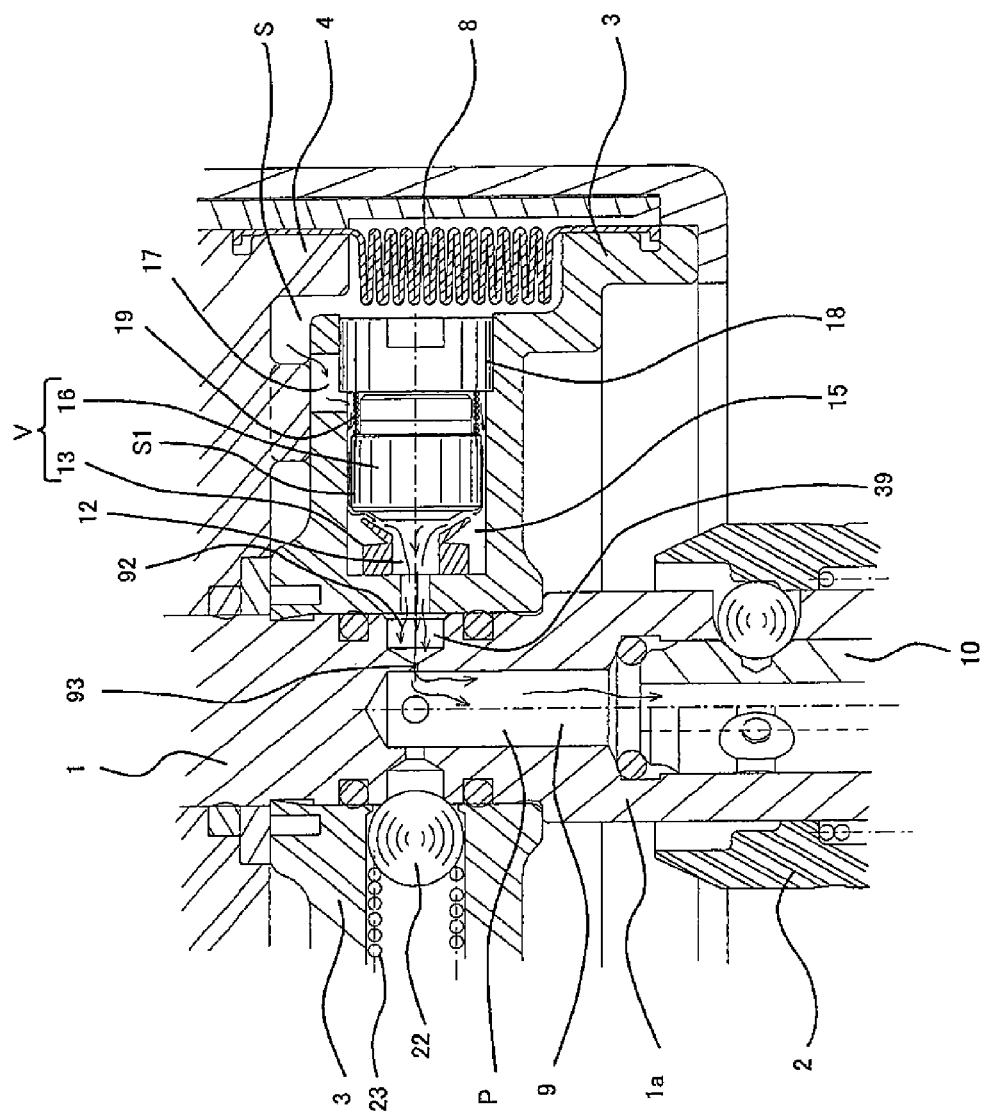
FIG. 4 is an enlarged sectional partial view of FIG. 2.

FIG. 4 is an enlarged sectional partial view of FIG. 2. As shown in FIG. 4, a valve element accommodating hole 15, which is radially extending cylindrical space, is formed in a circumferential surface of the first flange member 3. Inside the first flange member 3, a small hole 39 whose diameter is less than that of the valve element accommodating hole 15 is formed between the rotating shaft 1 and the valve element accommodating hole 15. A supply valve V is disposed within the valve element accommodating hole 15. A first communication hole 17 is formed in the upper surface of the first flange member 3. The first communication hole 17 allows the coolant to flow between the space S and the valve element accommodating hole 15. A gap S1 is formed between the supply valve V and inner surfaces of the valve element accommodating hole 15.

When the cylindrical body 8 is compressed from the expanded state and the rotating shaft 1 rotates, the coolant in the space S of the cylindrical body 8 is pushed out of the space S to the passage 100 of the drill 10. Hereinafter, a coolant supply passage extending from the space S to the passage 100 is described.

As shown in FIG. 4, a coolant supply passage P is formed, which extends from the space S to the distal end 1a of the rotating shaft 1. The coolant supply passage P includes: a first supply passage 9 extending in the up-down direction within the rotating shaft 1; a second supply passage 92 extending in the radial direction of the first flange member 3, the second supply passage 92 connecting the valve element accommodating hole 15 and the upper end of the first supply passage 9; and the gap S1. As shown in FIG. 1, the first supply passage 9 is connected to the passage 100 of the drill 10.

The supply valve V includes: a valve element 16 configured to move in the radial direction of the first flange member 3; and a valve seat 13 positioned more inside than the valve element 16 in the radial direction of the first flange member 3. The valve seat 13 is formed of an elastic material such as rubber.

Figure 5A:
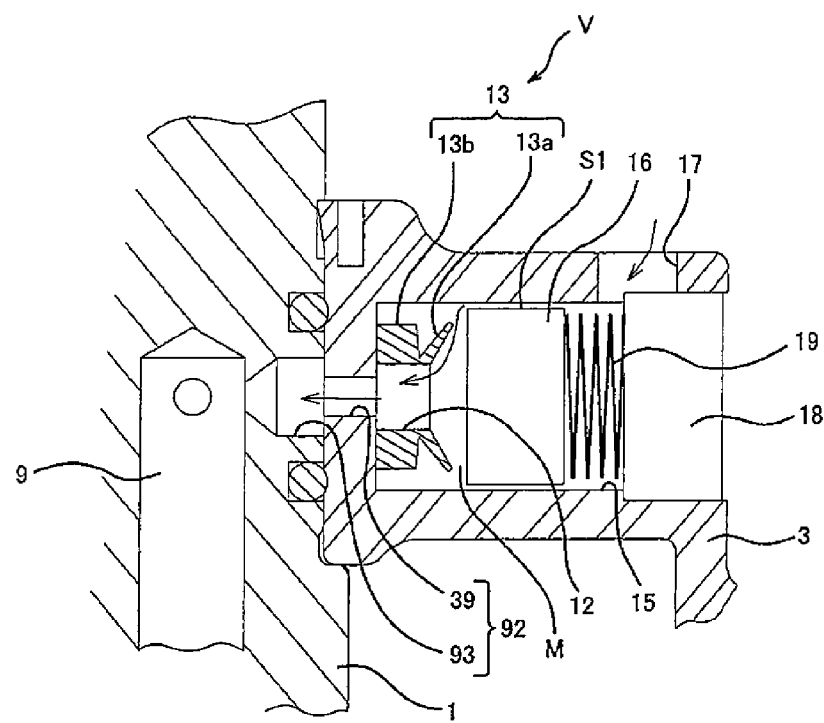
FIGS. 5A and 5B are enlarged views of a supply valve.
Figure 5B:
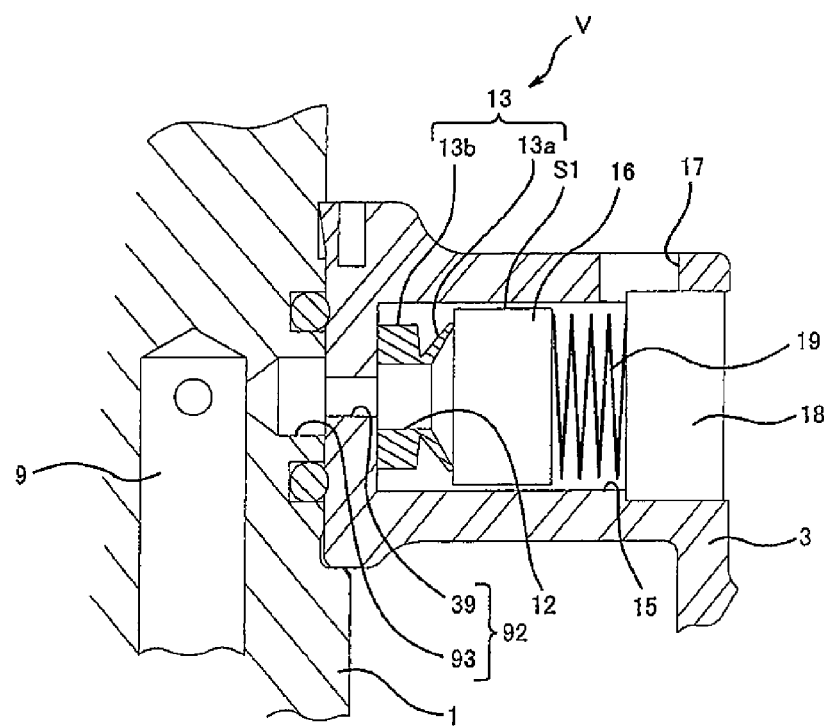

FIGS. 5A and 5B are enlarged views of the supply valve V. The valve seat 13 includes: an annular body 13b; and a lip member 13a extending outwardly from the body 13b in the radial direction of the first flange member 3. The lip member 13a and the annular body 13b are integrated together. An opening 12 is formed through the center of the body 13b. The opening 12 is continuous with the small hole 39.

The second supply passage 92 includes: the small hole 39; and a second communication hole 93 positioned between the small hole 39 and the first supply passage 9 and formed in a circumferential surface of the rotating shaft 1. A female screw is formed at an opening end of the valve element accommodating hole 15. A set bolt 18 is screwed into the female screw. A spring member 19 is provided between the valve element 16 and the set bolt 18. The valve element 16 is biased by the spring member 19 toward the inside in the radial direction of the first flange member 3. The spring force of the spring member 19 is set to be less than centrifugal force that is applied to the valve element 16 at the time of drilling (i.e., when the rotating shaft 1 is rotating). As shown in FIG. 5B, when the rotating shaft 1 is not rotating, the spring member 19 causes the distal end surface of the valve element 16 to be in contact with the lip 13a of the valve seat 13. Since the lip 13a has elasticity, the lip 13a is in close contact with the distal end surface of the valve element 16. The valve element 16 prevents the coolant in the valve element accommodating hole 15 from flowing into the opening 12. That is, the distal end surface of the valve element 16 serves as a "closely contacting portion" of the present invention, which serves to block the opening 12.

When the rotating shaft 1 rotates, the first flange member 3 rotates together with the rotating shaft 1. Due to centrifugal force, the valve element 16 is biased outwardly in the radial direction of the first flange member 3. As previously mentioned, the spring force of the spring member 19 is less than the centrifugal force applied to the valve element 16. Accordingly, as shown in FIG. 5A, the valve element 16 moves outwardly in the radial direction of the first flange member 3. As a result, small space M is formed between the valve element 16 and the lip 13a of the valve seat 13. The coolant in the space S of the cylindrical body 8 passes through the communication hole 17, the gap S1, and the small space M between the valve element 16 and the valve seat 13 to flow into the opening 12. Then, the coolant flows through the second supply passage 92 and the first supply passage 9 to reach the passage 100 of the drill 10.

When the rotation of the rotating shaft 1 is stopped, the centrifugal force is no longer applied to the valve element 16. Accordingly, as shown in FIG. 5B, the valve element 16 is pushed against the lip 13a of the valve seat 13 by the spring force of the spring member 19. As a result, the opening 12 is blocked by the valve element 16, and the coolant in the gap S1 does not flow into the second supply passage 92 and the first supply passage 9.

In the above manner, the coolant can be supplied to the drill 10 only when the rotating shaft 1 is rotating, that is, only when the drill 10 requires the coolant.

(Coolant Flow Rate Adjustment)

In some cases, it is desirable to adjust the amount of coolant supplied to the drill 10 in accordance with, for example, the type of a workpiece to be drilled or the depth of a hole to be drilled. The coolant supply device A according to the present embodiment is configured such that the flow rate of the coolant supplied to the drill 10 can be adjusted as desired by an operator.

Figure 6:
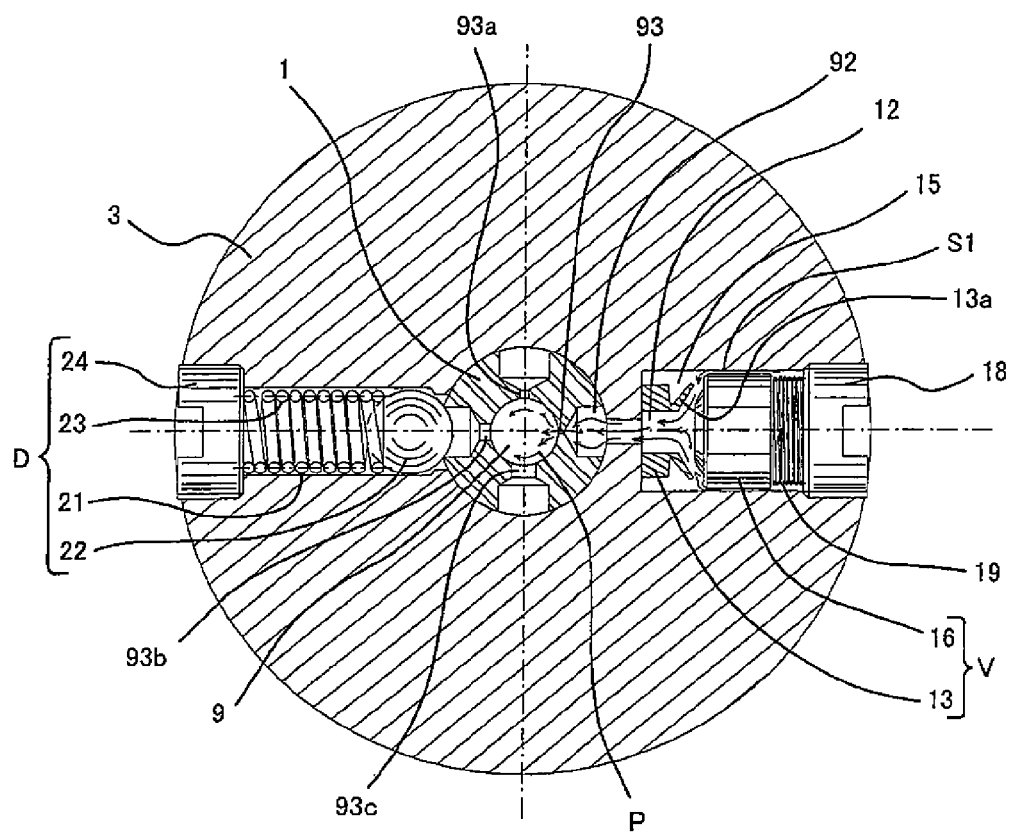
FIG. 6 is an enlarged cutaway sectional view of FIG. 1, the view being taken along a plane including line V-V of FIG. 1, the view being seen in the direction of the arrows of line V-V.

As previously described, the second communication hole 93 of the second supply passage 92 is formed in the circumferential surface of the rotating shaft 1. As shown in FIG. 6, other than the second communication hole 93, three second communication holes 93a, 93b, and 93c having different passage sectional areas from each other are radially formed in the circumferential surface of the rotating shaft 1. By rotating the first flange member 3 with respect to the rotating shaft 1, each of the second communication holes 93, 93a, 93b, and 93c can be caused to face the small hole 39, and thereby the amount of coolant flowing from the cylindrical body 8 to the first supply passage 9 can be adjusted. The first flange member 3 may be rotated with respect to the rotating shaft 1, for example, in the following manner: fix the rotating shaft 1 by means of the electric drilling tool; and then rotate the lower cover 50 by a hand of an operator.

Although the first flange member 3 can be manually rotated with respect to the rotating shaft 1 as described above, the first flange member 3 and the rotating shaft 1 are required to rotate integrally with each other when the drill 10 is used. Therefore, in the first flange member 3, a rotation positioning mechanism D configured to set relative rotation positions of the first flange member 3 and the rotating shaft 1 relative to each other is provided at the opposite side to the valve element accommodating hole 15 with respect to the rotating shaft 1.

As shown in FIG. 6, the rotation positioning mechanism D includes a ball 22, a spring 23, and a set bolt 24, which are arranged within a retention hole 21 formed in the radial direction of the first flange member 3. The ball 22 is a positioning ball. The spring 23 pushes the ball 22 inwardly. The set bolt 24 holds the spring 23 from the outer peripheral side of the first flange member 3. The ball 22 is formed to have a diameter larger than the diameter of a proximal end opening of each of the second communication holes 93, 93a, 93b, and 93c. Therefore, the ball 22 does not fully enter the second communication holes 93, 93a, 93b, and 93c. The ball 22 becomes locked to the second communication hole 93b, which is positioned at the opposite side to the second communication hole 93 with respect to the rotating shaft 1, the second communication hole 93 being used for supplying the coolant, and thereby the rotation position of the first flange member 3 relative to the rotating shaft 1 is set. Such setting of the rotation position of the first flange member 3 is made when the second communication hole 93b, which is positioned at the opposite side to the second communication hole 93 with respect to the rotating shaft 1, is selected, the second communication hole 93 having such a passage sectional area as to allow a suitable amount of coolant to be obtained.

It should be noted that when an operator manually rotates the first flange member 3 with respect to the rotating shaft 1 in the above-described manner, the operator is required to apply rotational force that is greater than friction force exerted between the ball 22 pushed by the spring 23 and each of the second communication holes 93, 93a, 93b, and 93c.

(Cylindrical Body Holding Mechanism)

As previously described, the coolant is supplied into the cylindrical body 8 when the cylindrical body 8 is in the expanded state. In this case, it is onerous for an operator to manually hold the cylindrical body 8 in the expanded state throughout the entire period of supplying the coolant. Such onerous work is a burden for the operator. Therefore, the coolant supply device A according to the present embodiment includes a cylindrical body holding mechanism 200 configured to hold the cylindrical body 8 in the expanded state.

Figure 7A:
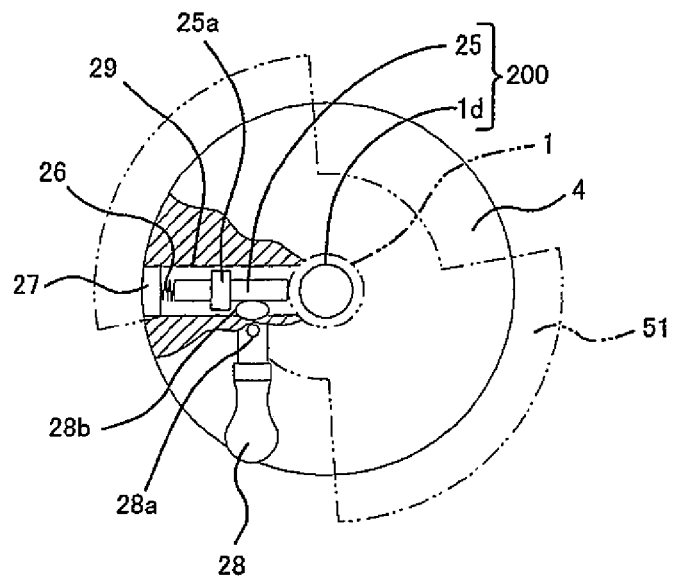
FIGS. 7A and 7B are partially cutaway plan views of a second flange member.
Figure 7B:
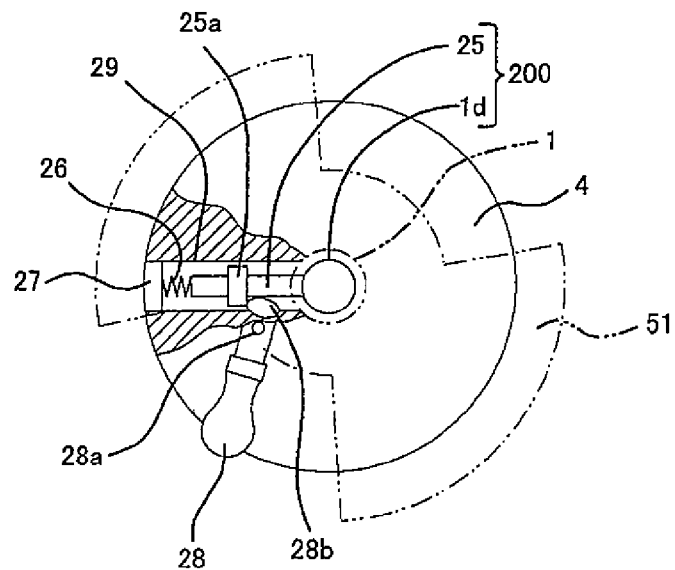

As shown in FIG. 1, a recess 1d is formed in the rotating shaft 1 at a position slightly lower than the position of the grip portion 51 when the cylindrical body 8 is in the expanded state. Meanwhile, as shown in FIGS. 7A and 7B, a lateral hole 29 is formed in the second flange member 4, such that the lateral hole 29 extends from the inner periphery to the outer periphery of the second flange member 4. A pin-shaped stopper member 25, the distal end of which comes into engagement with the recess 1d, is movably disposed in the lateral hole 29. The outer peripheral end of the lateral hole 29 is blocked by a stopper screw 27. A spring 26 is disposed between the stopper screw 27 and the stopper member 25. A middle portion of the stopper member 25 in the longitudinal direction is provided with a flange 25a. The stopper member 25 and the recess 1d form the cylindrical body holding mechanism 200.

The second flange member 4 is provided with an operating lever 28, which is swingable about a pivot 28a in a horizontal plane. The operating lever 28 has a free end 28b, which extends downward into the lateral hole 29 and contacts the flange 25a of the stopper member 25.

In a state shown in FIG. 7A, the flange 25a is pushed by the free end 28b of the operating lever 28 and resists against the spring 26, such that the distal end of the stopper member 25 is removed from the recess 1d. That is, the second flange member 4 is not locked to the rotating shaft 1. When the second flange member 4 is in such a state, the cylindrical body 8 is compressed from the expanded state or expanded from the compressed state.

In order for a user to hold the cylindrical body 8 in the expanded state, the user is required to lift the second flange member 4 until the cylindrical body 8 enters the expanded state. The stopper member 25 is biased by the spring 26 and the distal end of the stopper member 25 comes into engagement with the recess 1d, and thus the second flange member 4 is locked to the rotating shaft 1 and the cylindrical body 8 is held in the expanded state.

In order for the user to release the cylindrical body 8 from the expanded state, the user is required to swing the operating lever 28 to remove the distal end of the stopper member 25 from the recess 1d by means of the free end 28b.

In other words, by swinging the operating lever 28, the state of the stopper member 25 is switched from a state of being locked to the recess 1d of the rotating shaft 1 to an unlocked state. In this manner, the state of the cylindrical body 8 is switched between being held in the expanded state and being released from the expanded state.

(Coolant Injection Operation)

The coolant supply device A configured as described above is capable of storing the coolant in the space S prior to performing drilling by the drill 10, and at the time of performing the drilling by the drill 10, supplying a suitable amount of coolant for the drilling.

First, an operator holds the grip portion 51 of FIG. 1 with one hand and lifts the upper cover 5. At the same time, the operator holds the lower cover 50 with the other hand and sets the cylindrical body 8 to the expanded state. The spring 26 causes the stopper member 25 to be locked to the recess 1d, and thus the expanded state of the cylindrical body 8 is maintained.

Next, as shown in FIG. 1, the coolant stored in the supply container T is supplied from the supply container T into the space S through the coolant supply port 32. As previously described, the cylindrical body 8, the lower cover 50, and the upper cover 5 are each formed of a transparent or semi-transparent resin, which allows the amount of coolant in the cylindrical body 8 to be visually confirmed from the outside of the coolant supply device A.

When a predetermined amount of coolant is injected into the space S, the operator removes the supply container T from the coolant supply port 32. Next, the operator operates the operating lever 28 to release the stopper member 25 from the state of being locked to the recess 1d. As a result of the stopper member 25 being released from the locked state, the second flange member 4 is allowed to move along the rotating shaft 1. The second flange member 4 is pushed toward the first flange member 3 by the push spring 6. The coolant in the space S is pushed toward the first communication hole 17 of the first flange member 3. That is, the second flange member 4, the first flange member 3, and the push spring 6 form a "coolant push-out mechanism" of the present invention. Then, the operator inserts the proximal end 1b of the rotating shaft 1 into the insertion hole of the rotating shaft holder of the electric drilling tool (not shown).

In such a state, if the electric drilling tool is turned ON and the rotating shaft holder of the electric drilling tool is rotated, then the first flange member 3 and the second flange member 4 rotate together with the rotating shaft 1. The lower cover 50 and the upper cover 5 protect the cylindrical body 8 from the outside, and prevent the cylindrical body 8 in which the coolant is stored from being deformed outwardly due to centrifugal force or gravity.

When the centrifugal force exerted on the valve element 16 exceeds the spring force of the spring member 19 due to rotation of the first flange member 3, the valve element 16 is removed outwardly from the lip member 13a, and thereby small space is formed. Since the second flange member 4 is pushed toward the first flange member 3 due to the spring force of the push spring 6, the coolant stored in the space S is pushed out of the space S by the spring force. The coolant then flows from the communication hole 17 through the gap S1, the second supply passage 92, and the first supply passage 9 to the passage 100 of the drill 10. That is, the coolant flows through the coolant supply passage P, and is supplied from the rotating shaft 1 to the passage 100 of the drill 10.

In some cases, it is desirable to change the amount of coolant supplied to the passage 100 of the drill 10 in accordance with, for example, the type of a workpiece to be drilled or the type of the drill to be used. In such a case, the operator manually rotates the rotating shaft 1 with respect to the first flange member 3, and thereafter causes the first flange member 3 and the rotating shaft 1 to come into engagement with each other by using the rotation positioning mechanism D. In this manner, selection can be made on the second supply passage 92, which includes distal ends 93, 93a, 93b, and 93c having respective passage sectional areas that allow an optimal amount of coolant to be obtained.

According to the coolant supply device of the present embodiment, the coolant at least in a minimum required amount for drilling is stored in the space between the flange members. At the time of drilling, the coolant can be supplied to the drilling portion at the distal end of the drill by means of the coolant push-out mechanism. This eliminates a need for the operator to carry around a coolant tank including a coolant supply pump, and thereby realizes a high degree of freedom in handling the electric drilling tool. Since it is no longer necessary to carry around a coolant tank, drilling work in small space can be readily performed. Therefore, by applying the coolant supply device according to the present embodiment to a battery-powered electric drilling tool, the advantages of the battery-powered electric drilling tool can be made use of to a greater degree.

Figure 8:
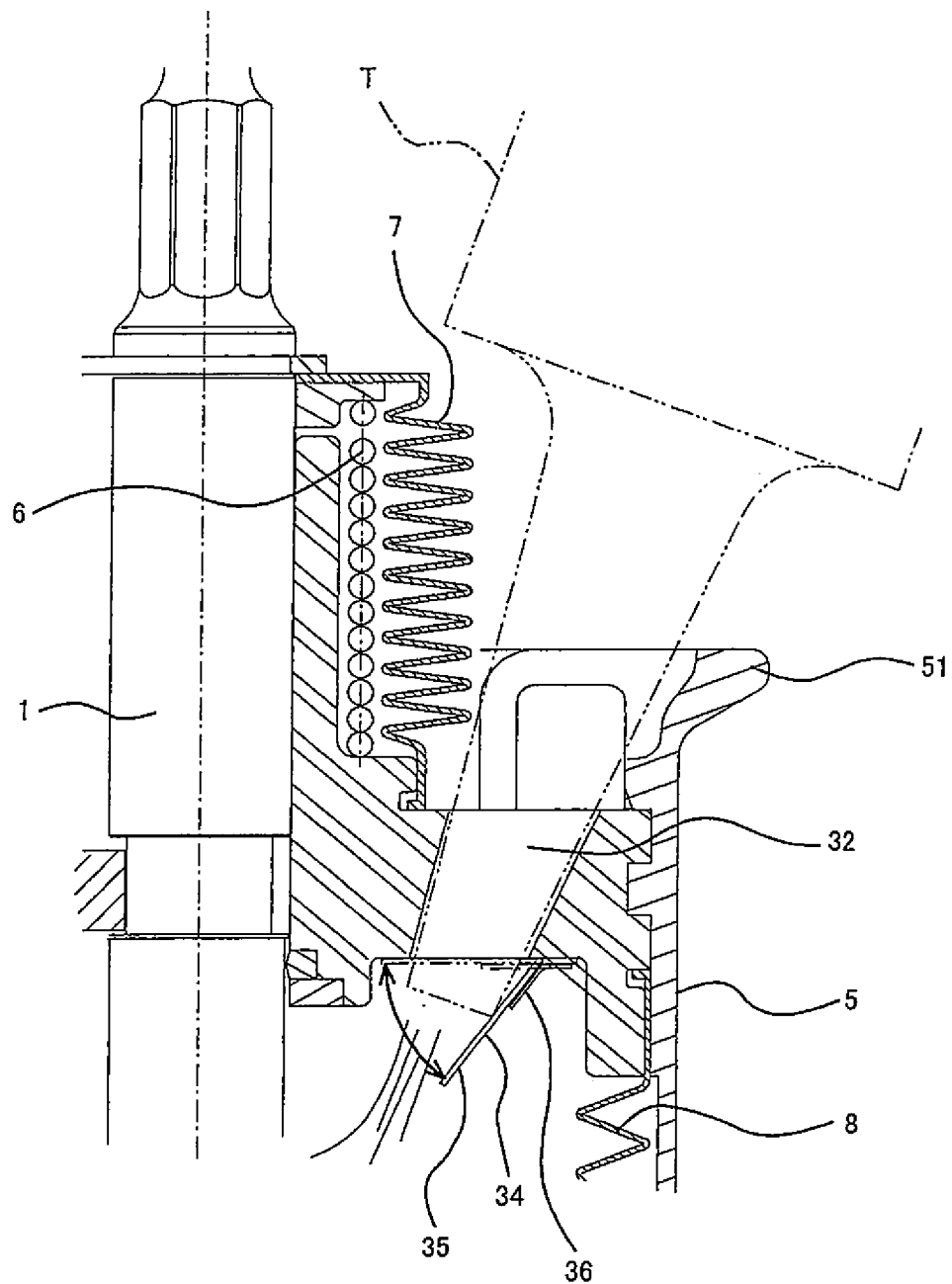
FIG. 8 is an enlarged partial view showing a coolant supply port shown in FIG. 1 and a check valve provided at the coolant supply port.

FIG. 8 shows an application example of the present embodiment. FIG. 8 shows the coolant supply port 32 and its surroundings in an enlarged manner. The coolant supply port 32 is provided with a check valve 34. The check valve 34 can be freely opened and closed via swinging movement of a plate-shaped valve element 35. The plate-shaped valve element 35 is configured to swing about its proximal end, and opens only when the distal end of the supply container T storing the coolant is inserted into the coolant supply port 32. A leaf or wire spring 36 is disposed at the proximal end of the valve element 35. The spring 36 biases the valve element 35 to cause the valve element 35 to block the coolant supply port 32.

When the coolant is not injected through the coolant supply port 32, the coolant supply port 32 is blocked by the valve element 35. This makes is possible to prevent dirt or the like from accidentally entering the space S through the coolant supply port 32.

Embodiment 2

Figure 9:
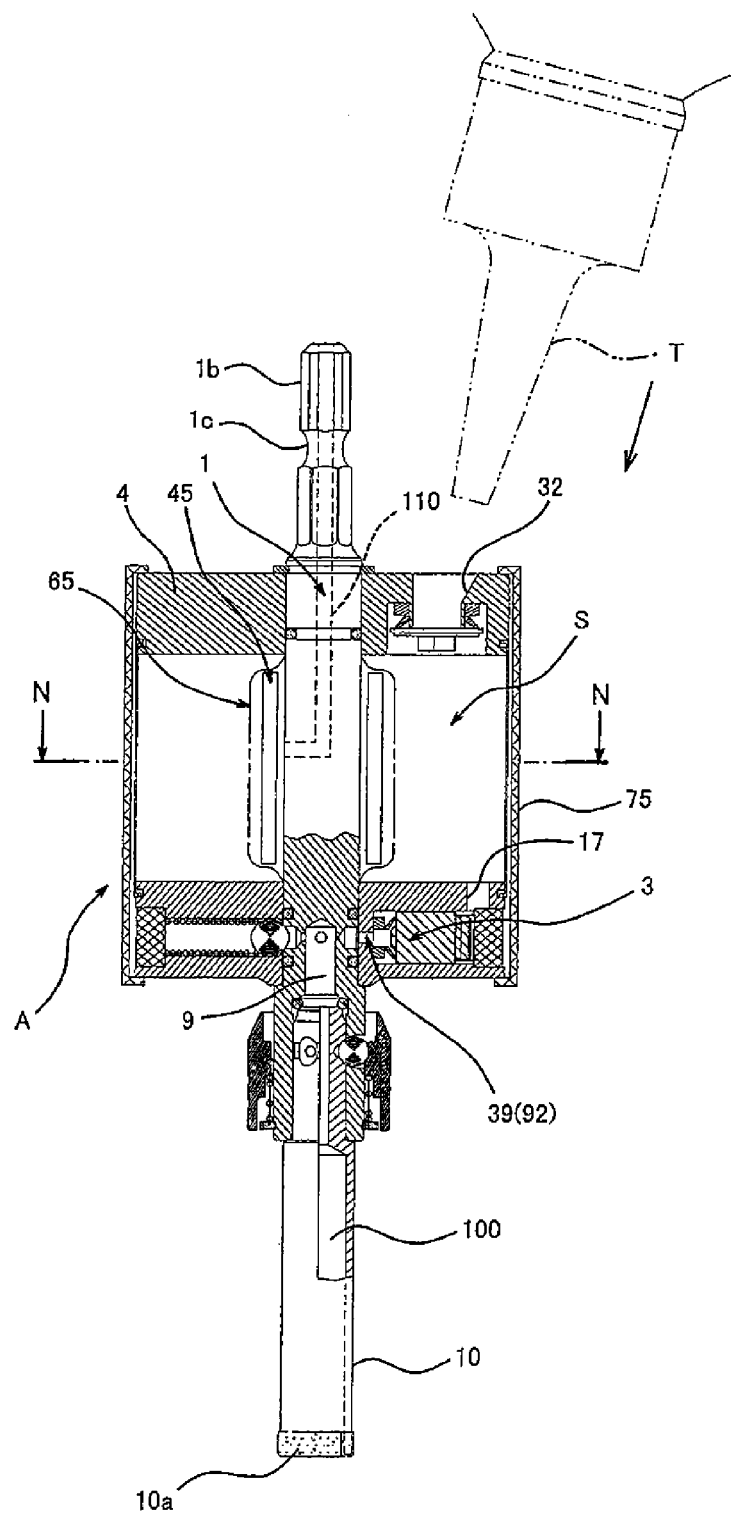
FIG. 9 is a cutaway sectional side view of a coolant supply device according to another embodiment, the view being taken along the axial direction of the coolant supply device.
Figure 10:
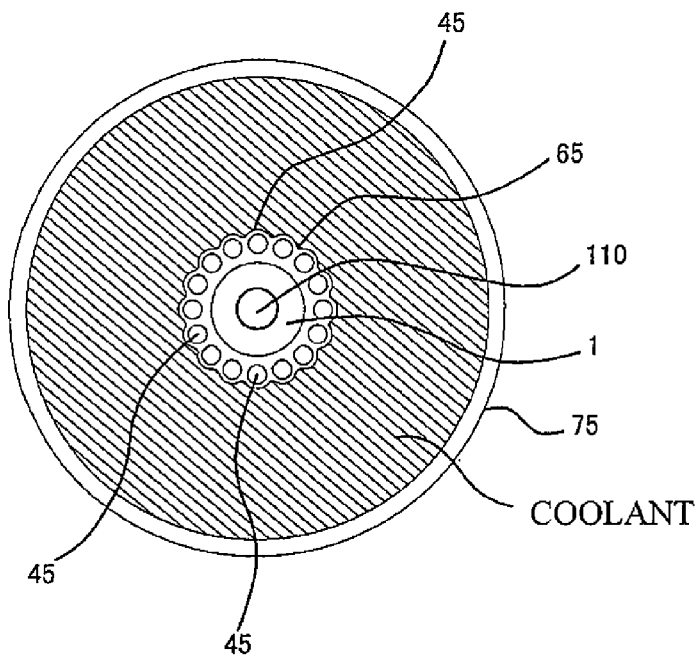
FIG. 10 is a cutaway sectional plan view of the coolant supply device of FIG. 9, the view being taken along a plane including line N-N of FIG. 9, the view being seen in the direction of the arrows of line N-N.

FIG. 9 is a cutaway sectional side view of the coolant supply device A according to Embodiment 2, the view being taken along the axial direction of the coolant supply device A. FIG. 10 is a cutaway sectional plan view of the coolant supply device A of FIG. 9, the view being taken along a plane including line N-N of FIG. 9, the view being seen in the direction of the arrows of line N-N. In the coolant supply device A according to the present embodiment, the first flange member 3 is provided at the lower end of the inside of a cylindrical container 75, and the second flange member 4 is provided at the upper end of the inside of the container 75. The rotating shaft 1 extending in the up-down direction is fitted to a central portion of the container 75. The first flange member 3 and the second flange member 4 are attached to the rotating shaft 1. Unlike Embodiment 1, the second flange member 4 is neither lifted nor lowered.

Between the flange members 3 and 4, a plurality of weights 45, which extend in the up-down direction, are arranged around the rotating shaft 1. The plurality of weights 45 are movable in the radial direction of the rotating shaft 1. A diaphragm 65, which is expandable in a balloon-like manner, is disposed outside the plurality of weights 45. The diaphragm 65, when in a contraction state, causes the plurality of weights 45 to be in contact with the rotating shaft 1. That is, the diaphragm 65 is normally in a contraction state, and when air flows into the inside of the diaphragm 65, the diaphragm 65 expands against the contraction force. Space S, into which the coolant is injected, is formed outside the diaphragm 65 between the flange members 3 and 4. An air hole 110, through which air flows, is formed to extend in the up-down direction through the inside of the rotating shaft 1. The upper end of the air hole 110 is open at the upper end surface of the rotating shaft 1, and the lower end of the air hole 110 is open at the circumferential surface of the rotating shaft 1 inside the diaphragm 65. That is, air is taken in from the upper end of the air hole 110, and is discharged to the inside of the diaphragm 65.

Similar to Embodiment 1, the first communication hole 17 is formed in the upper surface of the first flange member 3, and the first communication hole 17 communicates with the first supply passage 9 via the second supply passage 92. Also, similar to Embodiment 1, the coolant supply port 32 is formed in the second flange member 4.

Figure 11:
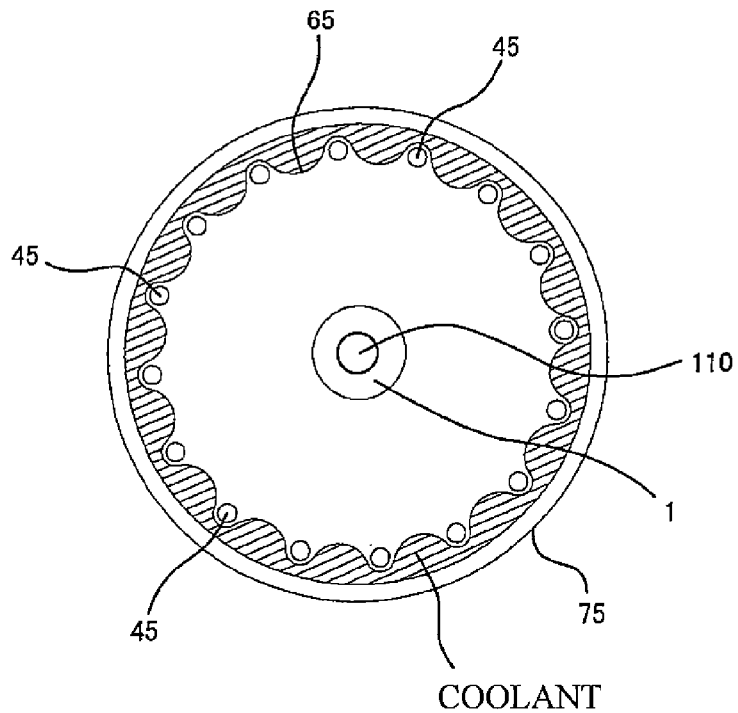
FIG. 11 is a sectional plan view of the coolant supply device when a rotating shaft is in a rotating state.

As shown in FIG. 10, when the coolant is injected into the space S through the coolant supply port 32, the diaphragm 65 is maintained in a contraction state. In the contraction state, if the rotating shaft 1 is rotated, then centrifugal force is applied to the weights 45. As a result, the weights 45 move outwardly in the radial direction, which causes the diaphragm 65 to be pulled outwardly in the radial direction of the rotating shaft 1. Air is sucked in through the upper-end opening of the air hole 110. Consequently, the diaphragm 65 expands as shown in FIG. 11, and the coolant pressure in the space S increases and the coolant is pushed out of the space S to the first communication hole 17. The coolant flows from the first communication hole 17 of the first flange member 3 to the first supply passage 9 through the second supply passage 92, and is supplied to the passage 100 of the drill 10. That is, the diaphragm 65 and the weights 45 form the "coolant push-out mechanism" of the present invention.

When the rotation of the rotating shaft 1 is stopped, centrifugal force is no longer applied to the weights 45. As a result, the diaphragm 65 contracts and the weights 45 come into contact with the rotating shaft 1.

As an alternative to the configuration shown in FIG. 9, the weights 45 and the diaphragm 65 may be eliminated from the coolant supply device A, and in a state where the coolant is stored in the space S, compressed air may be supplied from the upper end toward the lower end of the air hole 110. The coolant in the space S is pushed by the pressure of the air, so that the coolant in the space S is pushed out of the space S toward the coolant supply passage P.

In the above description, the coolant is supplied from the supply container T into the space S. However, the coolant may be supplied into the space S not from the supply container T but from a funnel (not shown).

In Embodiment 1 described above, movement of the first flange member 3 along the rotating shaft 1 is restricted, and the second flange member 4 is configured to be lifted and lowered along the rotating shaft 1. However, as an alternative to this configuration, the second flange member 4 may be fixed to the rotating shaft 1 in the axial direction, and the first flange member 3 may be disposed in such a manner that the first flange member 3 is movable (slidable) toward and away from the second flange member 4. Further alternatively, the first flange member 3 and the second flange member 4 may be disposed in such a manner that both of the first flange member 3 and the second flange member 4 are movable (slidable) toward and away from each other on the rotating shaft 1.

It will be understood that in a case where the above-described coolant supply device A is used for an electric drilling tool that is provided with a power cord, the upper end of the rotating shaft 1 may be formed to have a columnar or prismatic shape although such a shape is not shown in the drawings. Alternatively, the shape of the proximal end of the rotating shaft 1 may be formed differently from the shape shown in FIG. 1 in accordance with the shape of the rotating shaft holder of the electric drilling tool. Also in such a case, the coolant supply device according to the present invention is applicable.

From the foregoing description, numerous modifications and other embodiments of the present invention are obvious to one skilled in the art. Therefore, the foregoing description should be interpreted only as an example and is provided for the purpose of teaching one mode for carrying out the present invention to one skilled in the art. The structural and/or functional details may be substantially altered without departing from the spirit of the present invention.

INDUSTRIAL APPLICABILITY

The coolant supply device according to the present invention is useful for cooling down a drill that requires a coolant.

REFERENCE SIGNS LIST

A coolant supply device
P coolant supply passage
D rotation positioning mechanism
1 rotating shaft
3 first flange member
4 second flange member
6 push spring
8 cylindrical body
10 drill

The invention claimed is:

1. A coolant supply device attached to an electric drilling tool and configured to supply a coolant to a drilling portion at a distal end of a drill when the drill performs drilling, the coolant supply device comprising:
   a first flange member and a second flange member provided on a rotating shaft, the rotating shaft sharing a same axis with the drill, the first flange member being positioned at the drill side, the second flange member being positioned such that the second flange member is more distant from the drill than the first flange member along the rotating shaft;
   space formed between the flange members, into which a coolant is injected;
   a coolant supply passage formed between the first flange member and the drill, the coolant supply passage guiding the coolant in the space to the drill; and
   a coolant push-out mechanism configured to push the coolant out of the space toward the coolant supply passage;
   wherein the second flange member is configured to be lifted and lowered along the rotating shaft, and
   a locking portion is formed in the rotating shaft, the locking portion corresponding to a height position of the second flange member when the coolant is injected into the space, and
   the second flange member is provided with a stopper member configured to be removably locked to the locking portion.

2. The coolant supply device according to claim 1, further comprising:
   a supply valve disposed on the coolant supply passage and configured to switch a state of the coolant between a state of being allowed to flow from the space to the drill and a state of being blocked from flowing from the space to the drill, wherein
   the supply valve includes:
   a valve seat with an opening;
   a valve element positioned more outside than the valve seat in a radial direction of the rotating shaft, the valve element including a closely contacting portion configured to block the opening, the valve element being movable in the radial direction of the rotating shaft; and
   a spring member configured to bias the valve element toward the valve seat from a radially outer side in the radial direction of the rotating shaft, the spring member exerting such spring force as to allow the closely contacting portion to block the opening when the rotating shaft is in a non-rotating state and allow the closely contacting portion to be away from the opening when the rotating shaft is in a rotating state.

3. The coolant supply device according to claim 1, wherein
   a valve element accommodating hole, which accommodates the valve element in such a manner as to allow the valve element to move in the radial direction of the rotating shaft, is formed in the first flange member,
   the first flange member is configured to be rotatable with respect to the rotating shaft,
   a plurality of communication holes, which have different respective passage sectional areas and which come into communication with the valve element accommodating hole, are radially formed in the rotating shaft in the radial direction of the rotating shaft, and
   each of the communication holes is selectable in such a manner that, by rotating the first flange member prior to performing drilling, an intended one of the communication holes is caused to face the valve element accommodating hole, such that the coolant is supplied to the drilling portion at a suitable flow rate for the drilling.

4. The coolant supply device according to claim 3, wherein
   a rotation positioning mechanism is provided between the first flange member and the rotating shaft, and
   the rotation positioning mechanism maintains a state where a selected one of the plurality of communication holes faces the valve element accommodating hole.

5. The coolant supply device according to claim 1, wherein
   the coolant push-out mechanism includes a biasing device configured to bias the second flange member toward the first flange member to contract a volume of the space between the flange members.

6. An electric drill unit comprising:
   the coolant supply device according to claim 1; and
   an electric drilling tool to which the coolant supply device is attached.

* * * * *